United States Patent [19]
Nakagawa et al.

[11] Patent Number: 5,808,127
[45] Date of Patent: Sep. 15, 1998

[54] HYDROSILYLATION METHOD AND PROCESS FOR PRODUCING CURING AGENT MAKING USE OF THE SAME

[75] Inventors: Yoshiki Nakagawa; Masato Kusakabe, both of Hyogo, Japan

[73] Assignee: Kanegafuchi Kagaku Kogyo Kabushiki Kaisha, Osaka, Japan

[21] Appl. No.: 836,694

[22] PCT Filed: Nov. 16, 1995

[86] PCT No.: PCT/JP95/02349

§ 371 Date: May 16, 1997

§ 102(e) Date: May 16, 1997

[87] PCT Pub. No.: WO96/16106

PCT Pub. Date: May 30, 1996

[30] Foreign Application Priority Data

Nov. 18, 1994 [JP] Japan .................................... 6-308446

[51] Int. Cl.$^6$ ........................................................ C07F 7/08
[52] U.S. Cl. .............................................................. 556/479
[58] Field of Search .............................................. 556/479

[56] References Cited

U.S. PATENT DOCUMENTS 5,621,129  4/1997  Hayashi et al. ...................... 556/479 X

FOREIGN PATENT DOCUMENTS 3-294320  12/1991  Japan .
4-93364   3/1992   Japan .
5-5063    1/1993   Japan .

Primary Examiner—Paul F. Shaver
Attorney, Agent, or Firm—Armstrong, Westerman, Hattori, McLeland & Naughton

[57] ABSTRACT

This invention provides a hydrosilylation method in which hydrosilyl groups are added to olefin using a metal catalyst, which comprises controlling the hydrosilylation reaction by allowing a compound selected from thiazoles and phosphines to coexist in the reaction system, and a process making use thereof for the production of a hydrosilyl group-containing organic curing agent. This invention gives a method for easy control of hydrosilylation reaction and a process making use thereof for the production of an organic compound modifying silicon compound having 2 or more hydrosilyl groups in the molecule. This compound is used as a curing agent of addition type curable compositions. As an accompanying effect, storage stability of the produced curing agent is improved when a catalyst and additives of this invention remain therein, in comparison with the case in which only the catalyst remains.

9 Claims, 1 Drawing Sheet

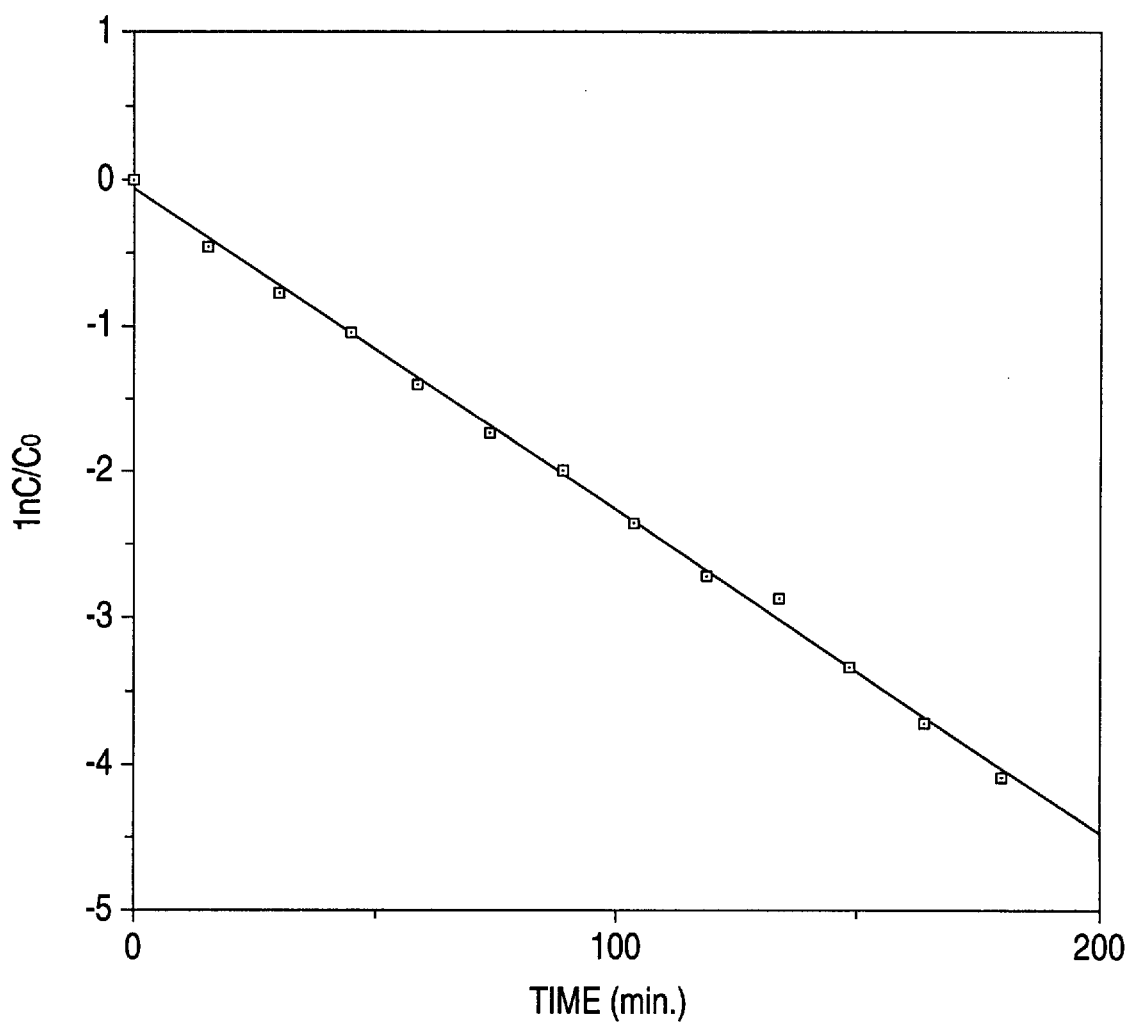
FIGURE

HYDROSILYLATION METHOD AND PROCESS FOR PRODUCING CURING AGENT MAKING USE OF THE SAME

TECHNICAL FIELD

This invention relates to a hydrosilylation method and a process for the production of an organic curing agent containing hydrosilyl groups.

BACKGROUND ART

Hydrosilylation reaction in which hydrosilyl group is added to olefin is broadly known as a method for the production of organic silicon compounds and used in various applications. As an example of such applications, various hydrosilyl group-containing organic curing agents have been developed as curable liquid compositions having excellent deep curability, in order to produce rubber-like substances through cross-linking and curing of polymers by hydrosilylation reaction.

Illustratively, an agent, in which a polyorganosiloxane having 2 or more in average of vinyl groups on terminals or in molecular chain of one molecule is cross-linked with a polyorganohydrogensiloxane having, in 1 molecule, 2 or more hydrogen atoms binding to the silicon atom, has been developed and used as sealing materials and potting materials making use of its excellent weather resistance, water resistance and heat resistance.

In addition, as disclosed in JP-A-3-95266 (the term "JP-A" as used herein refers to a "published unexamined Japanese patent application"), an organic curing agent has recently been developed which contains at least 2 hydrosilyl groups (not a polymer) in its molecule instead of the polyorganohydrogensiloxane usually used in curing reaction by hydrosilylation. According to the disclosure, this organic curing agent generally has good compatibility with alkenyl group-containing organic polymers.

In consequence, it has been found that, when the aforementioned alkenyl group-containing organic polymer is cured with the aforementioned organic curing agent which contains at least 2 hydrosilyl groups in its molecule using a hydrosilylation catalyst, excellent characteristics can be obtained as follows;

(1) since the aforementioned curable composition is a homogeneous system, quickly curable and excellent in deep curability, a cured product having excellent mechanical characteristics such as sufficient tensile characteristics and the like can be obtained from the curable composition, (2) since alkenyl group-containing organic polymers having any type of backbone skeleton can be used, curing agents applicable to markedly broad range of use can be produced, and (3) since the aforementioned organic curing agent which is not a polymer generally has low viscosity, it is advantageous from the viewpoint of workability for the production of cured products.

Hydrosilylation reaction is used also in the production of such an organic curing agent.

In general, when the hydrosilylation reaction is carried out to effect addition of hydrosilyl groups to olefin, various transition metal complexes such as of cobalt, rhodium, nickel, palladium, platinum and the like are used as catalysts. In that case, it is necessary to exclude catalyst poisons from the reaction system as many as possible. For example, Nielsen discloses various interfering substances and inhibiting substances in U.S. Pat. No. 3,383,356, and Ashby discloses a hydrosilylation catalyst which shows a higher activity than those of conventional catalysts due to the absence of interfering impurities in JP-A-60-54734.

On the other hand, various compounds are known as storage stability imparting agents for curable compositions of hydrosilylation cross-linking system. Examples of such compounds include an ethylenic or aromatic unsaturated amide (U.S. Pat. No. 4,337,332), an acethylenic compound (U.S. Pat. No. 3,445,420), an ethylenic unsaturated isocyanate (U.S. Pat. No. 3,882,083), an olefinic siloxane (U.S. Pat. No. 3,989,667), conjugate ene-ynes (U.S. Pat. No. 4,465,818), an unsaturated hydrocarbon diester inhibitor (U.S. Pat. No. 4,256,870), a bis-hydrocarbonoxyalkyl maleate inhibitor (U.S. Pat. No. 42562096) and the like. These storage stability imparting agents, however, are aimed at inhibiting catalytic activities at around room temperature but not reducing catalytic activities at the time of heating.

Since hydrosilylation catalysts activate silicon-hydrogen bonding at the time of hydrosilylation, they also cause side reactions. That is, side reactions such as hydrolysis of hydrosilyl groups, disproportionation and polymerization of polysiloxane and the like are generated.

When hydrosilyl groups are allowed to remain in product molecules, reduction of the number of remaining hydrosilyl groups caused by these side reactions becomes a great problem. Also, similar side reactions progress gradually during storage of the formed material after completion of the reaction and deteriorate its storage stability in some cases.

In addition, since the hydrosilylation reaction is exothermic, generation of an abrupt reaction may cause dangers such as sudden temperature increase and bumping in the reaction system. In general, the catalyst may be used in an irreducibly minimal amount in order to avoid such dangers, but, in that case, another problems such as unexpected inactivation of the catalyst and the like are apt to occur.

The object of the present invention is to provide a means for the production of a curing agent for a stabilized curable composition of hydrosilylation cross-linking system, making use of a hydrosilylation reaction in which hydrosilyl groups are added to olefin using a metal catalyst, wherein the hydrosilylation reaction is controlled to prevent the aforementioned side reactions.

DISCLOSURE OF THE INVENTION

Taking the aforementioned problems involved in the prior art into consideration, the inventors of the present invention have conducted intensive studies and found that control of the hydrosilylation reaction can be achieved through appropriate repression of the catalytic activity by positively adding a catalyst poison to the reaction system, and have thereby accomplished the present invention.

The above object can be achieved by the hydrosilylation method of the present invention and a process for the production of a curing agent making use thereof.

Accordingly, the present invention comprises the following construction.

1. A hydrosilylation method in which hydrosilyl groups are added to olefin using a metal catalyst, which comprises controlling the hydrosilylation reaction by allowing a compound selected from thiazoles and phosphines to coexist in the reaction system.

2. The hydrosilylation method according to the above item 1, wherein the compound selected from thiazoles and phosphines is benzothiazole.

3. The hydrosilylation method according to the above item 1, wherein the compound selected from thiazoles and phosphines is triphenylphosphirie.

4. The hydrosilylation method according to any one of the above items 1 to 3, wherein the metal catalyst is a platinum catalyst.

5. A hydrosilylation method which comprises carrying out hydrosilylation in accordance with the method of any one of the above items 1 to 4 under such conditions that hydrosilyl groups are present in excess of the number of olefin carbon-carbon double bonds.

6. A process for producing an organic curing agent containing hydrosilyl groups, which comprises carrying out hydrosilylation of olefin and a polyvalent hydrogen organosilicon compound using the method of the above item 1, under the conditions of the method of the above item 5 so that hydrosilyl groups remain in the formed material after the reaction.

7. The process for producing an organic curing agent containing hydrosilyl groups according to the above item 6, wherein the compound selected from thiazoles and phosphines is benzothiazole.

8. The process for producing an organic curing agent containing hydrosilyl groups according to the above item 6, wherein the compound selected from thiazoles and phosphines is triphenylphosphine.

9. The process for producing an organic curing agent containing hydrosilyl groups according to the above item 6, wherein the olefin is selected from a group consisting of the following formulae (1) to (4):

$$[CH_2=C(R^1)-R^2-O]_aR^3 \quad (1)$$

$$[CH_2=C(R^1)-R^2-C(=O)]_aR^4 \quad (2)$$

$$[CH_2=C(R^1)]_aR^5 \quad (3)$$

$$[CH_2=C(R^1)-R^2-C(=O)-O]_aR^6 \quad (4)$$

wherein $R^1$ represents a hydrogen atom or a methyl group; $R^2$ represents a hydrocarbon radical having 0 to 18 carbon atoms, which may contain at least one ether linkage; each of $R^3$, $R^4$ and $R^6$ represents a monovalent to tetravalent organic group having 1 to 30 carbon atoms; $R^5$ represents a monovalent to tetravalent hydrocarbon radical having 1 to 50 carbon atoms; and a is an integer selected from 1 to 4.

10. The process for producing an organic curing agent containing hydrosilyl groups according to the above item 6 or 9, wherein the polyvalent hydrogen organosilicon compound is a trimethylsilyl terminal polymethylhydrosiloxane.

11. The process for producing an organic curing agent containing hydrosilyl groups according to the above item 6 or 9, wherein the polyvalent hydrogen organosilicon compound is a polyvalent hydrogen polyorganosiloxane of 500 or less molecular weight having 3 or more hydrosilyl groups in 1 molecule.

12. The process for producing an organic curing agent containing hydrosilyl groups according to any one of the above items 6, 9 and 11, wherein the olefin is 1,9-decadiene and the polyvalent hydrogen organosilicon compound is 1,3,5,7-tetramethylcyclotetrasiloxane.

13. The process for producing an organic curing agent containing hydrosilyl groups according to any one of the above items 6 to 12, wherein a compound selected from thiazoles and phosphines is added after completion of the addition reaction of hydrosilyl groups to olefin using a metal catalyst.

14. The process for producing an organic curing agent according to the above item 6, wherein the hydrosilylation reaction is carried out in the absence of solvent.

That is, a first aspect of the present invention is the method disclosed in each of the aforementioned items 1 to 5 in which the addition reaction of hydrosilyl (Si-H) groups to olefin using a metal catalyst is controlled by allowing a compound selected from thiazoles and phosphines to coexist in the reaction system.

A second aspect of the present invention is the process for the production of an organic curing agent containing hydrosilyl groups, disclosed in each of the aforementioned items 6 to 14, which is characterized in that hydrosilylation of olefin and a polyvalent hydrogen organosilicon compound is carried out using the method of the first aspect of the present invention under such conditions that hydrosilyl groups remain in the formed material after the reaction, particularly in that the reaction is controlled by the method of aforementioned item 5 and the aforementioned polyvalent hydrogen organosilicon compound is used as the hydrosilyl group-containing compound.

The term "to control the reaction" as used herein means, for example, to inhibit occurrence of sudden reaction in hydrosilylation reaction using a metal catalyst, thereby preventing side reactions such as hydrolysis of hydrosilyl groups, disproportionation and polymerization of polysiloxane and the like and, when hydrosilyl groups are allowed to remain in product molecules, preventing reduction of the number of remaining hydrosilyl groups caused by these side reactions.

The thiazoles to be used in the hydrosilylation method are not particularly limited, but benzothiazole may be used preferably. The phosphines are also not particularly limited, but triphenylphosphine may be preferable.

There is no particular limitation on the amount of the aforementioned thiazoles and phosphines (also to be referred to as "additives" hereinafter) to be added to control the aforementioned reaction of the hydrosilylation method of the present invention. The amount of the additives varies due to kind, amount, concentration and the like of each olefin, hydrosilyl group-containing compound and catalyst, and depends on the desired degree of the reaction repression. Amount of the additives if too large would entail considerably slow reaction, and if too small would not bear sufficient effect. In general cases, it may be preferably from about 1 to 1,000 moles, more preferably from about 5 to 50 moles, per 1 mole of the catalyst.

Though not particularly limited, examples of metal complexes to be used as the catalyst include a platinum catalyst, a rhodium catalyst (e.g., RhCl(PPh$_3$)$_3$ or RhAl$_2$O$_3$), a ruthenium catalyst (e.g., RuCl$_3$), an iridium catalyst (e.g., IrCl$_3$), an iron catalyst (e.g., FeCl$_3$), an aluminum catalyst (e.g., AlCl$_3$), a palladium catalyst (e.g., PdCl$_2$.2H$_2$O), a nickel catalyst (e.g., NiCl$_2$), a titanium catalyst (e.g., TiCl$_4$) and the like, of which a platinum catalyst is preferred.

The platinum catalyst useful in the present invention is selected from platinum metal on a carrier, platinum compounds and platinum complexes. Examples of platinum compounds and platinum complexes include chloroplatinic acid, chloroplatinic acid hexahydrate, a complex of chloroplatinic acid with an alcohol, aldehyde, ketone or the like, a platinum-olefin complex (e.g., Pt(CH$_2$=CH$_2$)$_2$Cl$_2$), a platinum-vinylsiloxane complex (e.g., Pt$_n$(ViMe$_2$SiOSiMe$_2$Vi)$_m$ or Pt[(MeViSiO)$_4$]$_m$) (wherein Me represents a methyl group, Vi represents a vinyl group, and m and n are integers), dicarbonyl dichloroplatinum and the like. Also useful are the platinum-hydrocarbon complexes disclosed by Ashby in U.S. Pat. Nos. 3,159,601 and 3,159,662 and the platinum-alcoholate catalyst disclosed by Lamoreaux in U.S. Pat. No. 3,220,972. The platinum chloride-olefin complex disclosed by Modic in U.S. Pat. No. 3,516,946 is also useful in the present invention.

Platinum metal is adhered on a carrier such as charcoal, alumina, zirconia or the like. Also useful in the present invention is a platinum-containing material which catalyzes reaction between silicon hydride and the unsaturated moiety of an unsaturated compound. Though not particularly limited, the catalyst may be used preferably in an amount of from $1 \times 10^{-1}$ to $1 \times 10^{-8}$ mol per 1 mol of carbon-carbon double bond. More preferably, it may be within the range of from $1 \times 10^{-3}$ to $1 \times 10^{-7}$ mol.

The olefin to be used in the hydrosilylation reaction means a compound having at least one carbon-carbon double bond capable of undergoing hydrosilylation and is not limited to $C_nH_2$, (n is an integer of two or more) but preferably a terminal olefin having a terminal carbon-carbon double bond.

Illustrative examples of olefin include linear alkenyl compounds such as propylene, 1-butene, 1-pentene, 1-hexene, 1-heptene, 1-octene, 1-decene and the like; diene compounds such as 1,5-hexadiene, 1,9-decadiene, 4-vinylcyclohexane and the like; styrene compounds such as styrene, α-methylstyrone and the like; halogenized olefinic unsaturated functional alkenyl compounds such as vinyl chloride, allyl bromide, allyl iodide, allylene bromide, tri- and tetrachloroethylene, tetrafluoroethylene, chloroprene, vinylidene chloride, dichlorostyrene and the like; oxygen-containing olefinic unsaturated functional alkenyl compounds such as allyl ether, vinyl ether, allyl alcohol, methyl vinyl carbinol, acrylic acid, methacrylic acid, vinyl acetic acid, oleic acid, linolenic acid, vinyl acetate, allyl acetate, butenyl acetate, allyl stearate, methacrylate, ethyl crotonate, diallyl succinate, diallyl phthalate and the like; nitrogen-containing olefinic unsaturated functional alkenyl compounds such as indigo, indole, acrylonitrile, allyl cyanide and the like; unsaturated silicon compounds such as vinyltrimethylsilane, allyltrimethylsilane and the like; conjugate diene polymers such as polyisoprene, polybutadiene and the like; olefin terminal polymers such as olefin terminal polypropylene glycol, olefin terminal hydrogenated polyisoprene, olefin terminal polyisobutylene, olefin terminal polyester, olefin terminal polycarbonate and the like; and alkenyl group-containing organopolysiloxane and the like.

In the production of organic curing agent containing hydrosilyl groups in accordance with the process of the present invention, particularly preferred olefin is an organic compound selected from a group consisting of the following formulae (1) to (4):

[CH$_2$=C(R$^1$)—R$^2$—O]aR$^3$     (1)

[CH$_2$=C(R$^1$)—R$^2$—C(=O)]aR$^4$     (2)

[CH$_2$=C(R$^1$)]aR$^5$     (3)

[CH$_2$=C(R$^1$)—R$^2$—C(=O)—O]aR$^6$     (4)

wherein R$^1$ represents a hydrogen atom or a methyl group; R$^2$ represents a hydrocarbon radical having 0 to 18 carbon atoms, which may contain at least one ether linkage; each of R$^3$, R$^4$ and R$^6$ represents a monovalent to tetravalent organic group having 1 to 30 carbon atoms; R$^5$ represents a monovalent to tetravalent hydrocarbon radical having 1 to 50 carbon atoms; and a is an integer selected from 1 to 4.

The hydrosilyl group-containing compound to be used in the hydrosilylation method of the present invention or the organic curing agent production process of the present invention is not particularly limited, with the proviso that it can be used in the hydrosilylation reaction, and its examples include compounds represented by the following formulae (5) to (7). In this instance, when used in the process of the production of the organic curing agent in the present invention, the hydrosilyl group-containing compound is a polyvalent hydrogen organosilicon compound, namely a compound which contains at least 2 hydrosilyl groups in one molecule, in other words, a compound which has at least 2 silicon atom-binding hydrogen atoms.

The silicon atom-binding hydrogen atoms may be located on the same Si atom or different Si atoms in the polyvalent hydrogen organosilicon compound molecule.

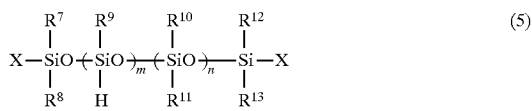

(In the above formula, R$^7$ to R$^{13}$ are the same or different from one another and each represents a substituted or unsubstituted alkyl group, a substituted or unsubstituted cycloalkyl group or a substituted or unsubstituted aryl group; X represents a hydrogen atom or a substituted or unsubstituted alkyl group, a substituted or unsubstituted cycloalkyl group or a substituted or unsubstituted aryl group; m is an integer of m>0 when X is a hydrogen atom or an integer of m≧1 when X is not a hydrogen atom; and n is an integer of n ≧0. In the organic curing agent production process of the present invention, m is an integer of m≧2.)

(In the above formula, R$^{14}$ to R$^{16}$ are the same or different from one another and each represents a substituted or unsubstituted alkyl group, a substituted or unsubstituted cycloalkyl group or a substituted or unsubstituted aryl group; and p≧1, q≧0 and p+q≧3. In the organic curing agent production process of the present invention, p≧2.)

(In the above formula, R$^{17}$ and R$^{18}$ are the same or different from each other and each represents a substituted or unsubstituted alkyl group, a substituted or unsubstituted cycloalkyl group or a substituted or unsubstituted aryl group and r is an integer of 0 to 3.)

Illustrative examples of the hydrosilyl group-containing compound include trimethylsilane, dimethylphenylsilane, dimethylsilane, methyldimethoxysilane, triethylsilane, triethoxysilane, trichlorosilane, methyldichlorosilane, dimethylchlorosilane, trimethoxysilane, tripropoxysilane, tributoxysilane, ethyldimethoxysilane, methyldiethoxysilane, dimethylmethoxysilane, dimethylethoxysilane, ethyldiethoxysilane, 1,1,3,3-tetramethyldisiloxane, 1,1,1,3,5,5,5-heptamethyltrisiloxane, terminal trimethylsilyl group-sealed methyl hydrogen siloxane polymer (H oil), dimethylsiloxane/methyl hydrogen siloxane copolymer, 1,3,5-trimethylcyclotrisiloxane, 1,3,5,7-tetramethylcyclotetrasiloxane and the like.

Examples of the polyvalent hydrogen organosilicon compound to be used in the organic curing agent production process of the present invention include 1,1,3,3-tetramethyldisiloxane, 1,1,3,3,5,5-hexamethyltrisiloxane, terminal trimethylsilyl group-sealed methyl hydrogen siloxane polymer (also called H oil), dimethylsiloxane/methyl hydrogen siloxane copolymer, 1,3,5-trimethylcyclotrisiloxane, 1,3,5,7-tetramethylcyclotetrasiloxane and the like.

Of these, a polyvalent hydrogen polyorganosiloxane of 500 or less in molecular weight having 3 or more hydrosilyl groups in 1 molecule is particularly preferred.

The hydrosilylation reaction of the hydrosilylation method of the present invention is carried out at a temperature of generally from 0° to 150° C., but preferably from 60° to 90° C. in order to make easy control in preventing undesirable side reactions.

In the organic curing agent production process of the present invention, an olefin compound and a polyvalent hydrogen organosilicon compound are used in such a manner that the organic curing agent produced by the hydrosilylation method of the present invention generally contains at least 2 hydrosilyl groups. Though combination of the olefin and polyvalent hydrogen organosilicon compound is not particularly limited, it may generally be divided roughly into two cases. That is, a case in which the olefin has only one carbon-carbon double bond in one molecule and another case in which it has a plurality of carbon-carbon double-bonds.

In the case of a single carbon-carbon double bond, combination of olefin and hydrosilyl group-containing compounds has a large degree of freedom because of no cross-linking by olefin molecules, and their ratio can be changed optionally under such conditions that the produced organic curing agent contains 2 or more hydrosilyl groups as described above. An illustrative example of such a case is modification by the hydrosilylation reaction of trimethylsilyl group-terminal polymethylhydrosiloxane (also called H oil) with α-olefin.

When olefin has a plurality of carbon-carbon double bonds, it is necessary to take into consideration a possibility of causing gelation of the whole reaction system due to generation of cross-linking by the olefin. In that case, it is desirable to use a polyvalent hydrogen organosilicon compound whose hydrosilyl groups are in excess of the number of the olefin carbon-carbon double bond. It is desirable also that excess polyvalent hydrogen organosilicon compound can be removed after completion of the hydrosilylation reaction. This compound may have a molecular weight of preferably 500 or less when it is removed from the formed organic curing agent by distillation.

When a catalyst remains in the product of the organic curing agent production process of the present invention, namely in an organic curing agent, various side reactions which cause problems in the course of the reaction of interest progress gradually even during storage of the product, thus causing deterioration of its storage stability in some cases. In the additives-added system of the present invention, such side reactions can be prevented and the storage stability can be improved when additives also remain in the product, but it is desirable to add another compound selected from phosphines and thiazoles in order to reduce the catalytic activity quickly after completion of the reaction and to ensure further stabilization of the product during its after-treatment and storage. When the amount of such an additional compound is too large, use of the product containing residual additives as a curing agent may adversely affect the curing reaction. Conversely, its amount if too small would bear no sufficient effect. In general cases, it may be used in an amount of from 1 to 1,000 moles, preferably from 5 to 50 moles, per catalyst.

In the hydrosilylation reaction of the organic curing agent production process of the present invention, a solvent such as n-pentane, n-hexane, n-heptane, benzene, toluene, xylene or the like or a plasticizer such as process oil or the like may be used depending on the necessity to control reaction temperature, viscosity of the reaction system and the like, but the reaction may be carried out preferably under solvent-free conditions, because it is desirable to obtain a material, generally a polyvalent hydrogen organosilicon compound, without purification when the material is recovered and recycled. Even under such solvent-free conditions, an extremely small amount of solvent may be used at the time of the addition of a catalyst and additives for the sake of their dispersibility and easy handling. Though not particularly limited, examples of the solvent for use in such a purpose include xylene, toluene, benzene and the like. Such a solvent may be used in an amount of preferably 1% or less of the total reaction solution volume, more preferably 0.1% or less when the recycle is frequent.

Method for the recovery of excess materials after completion of the reaction is not particularly limited, but it is desirable to carry out simple distillation under a reduced pressure in view of the prevention of modification caused by excess heating of the product and materials to be recovered and of easy handling, more preferably to use a thin film distillation apparatus from the viewpoint of short heating time and high throughput speed.

Operation for the recovery and recycle of the materials has no particular limitation. That is, corresponding amounts of consumed materials may be supplemented or only recovered materials may be collected and recycled.

There is no particular limitation about the apparatus for use in the practice of the hydrosilylation reaction of the present invention, but it is desirable to use a pressure vessel such as autoclave or the like when the reaction of olefin with a hydrosilyl group-containing compound is carried out at a temperature equal to or higher than the boiling point of the solvent used. In addition, it is desirable to use an apparatus having sufficient agitation capacity for the purpose of effecting homogeneous reaction.

BRIEF DESCRIPTION OF THE DRAWING

FIG. 1 is a graph showing an example of changes with time of the formation reaction of a hydrosilyl group-containing curing agent.

BEST MODE OF CARRYING OUT THE INVENTION

Examples of the present invention are given below by way of illustration and not by way of limitation.

Production Example 1:

A terminal allyl etherificated polyoxypropylene having a terminal carbon-carbon double bond was synthesized in accordance with the method disclosed in JP-A-53-134095. Polyoxypropylene glycol having an average molecular weight of 3,000 was mixed with sodium hydroxide powder at 60° C., and the reaction was carried out by adding bromochloromethane to increase the molecular weight. Next, thereto was added allyl chloride to effect terminal allyl etherification at 110° C. Thereafter, the mixture was treated with aluminum silicate to obtain purified terminal allyl etherificated polyoxypropylene. Average molecular weight of this polyether was about 8,000, and its allyl group content calculated from its iodine value was 0.023 mol/100 g. Its viscosity was 135 poise (40° C.) when measured by an E-type viscometer.

Inventive Example 1:

To 200 g of the terminal allyl etherificated polyoxypropylene synthesized in Production Example 1 were added 4.84 g of the organopolysiloxane-based curing agent (allyl and Si-H groups are equivalent) synthesized in Inventive Example 3 and $5.61 \times 10^{-4}$ mmol of Pt[{CH$_2$=CH}Me$_2$Si}$_2$O]$_2$ catalyst solution, followed by thorough mixing to be used as a master batch.

A 4 g portion of the batch was mixed with 7.6 mg of benzothiazole (1 wt % solution in toluene) (1 mole per platinum) and thoroughly kneaded. A portion of the mixture was put on a gelation testing apparatus (manufactured by Nisshin Kagaku) to measure a snap up time (time until it showed rubber elasticity) at a predetermined temperature.

In the same manner, respective snap up times were measured when benzothiazole was added in an amount of 10, 20 or 100 moles per platinum.

Inventive Example 2:

The test of Inventive Example 1 was repeated except that triphenylphosphine was used instead of benzothiazole. In this case, triphenylphosphine was used in an amount of 1, 1.5 or 3 moles per platinum.

Comparative Examples 1 to 5:

The test of Inventive Example 1 was repeated except that tributylamine, phenyl sulfide, N,N-dimethylacetamide, pyridine or o-nitroanisole was used instead of benzothiazole.

Table 1 shows results of the analysis of the products obtained in Inventive Examples 1 and 2 and Comparative Examples 1 to 5.

It is evident from these results that the reaction rate can be controlled by the amount of added benzothiazole or triphenylphosphine.

TABLE 1

| Additives | Amount in Mole | | | | | | |
|---|---|---|---|---|---|---|---|
| | 1 | 1.5 | 3 | 10 | 20 | 50 | 100 |
| Inventive Examples | | | | | | | |
| 1 | 6.0 | — | — | 34.3 | 270.0 | * | — |
| 2 | 9.7 | 133.0 | * | — | — | — | — |
| Comparative Examples | | | | | | | |
| 1 | 3.3 | — | — | 6.7 | — | 9.0 | — |
| 2 | 3.0 | — | — | 4.3 | — | 5.7 | — |
| 3 | 5.0 | — | — | 4.7 | — | 4.0 | — |
| 4 | 6.7 | — | — | 14.3 | — | 23.3 | 28.3 |
| 5 | 3.7 | — | — | 3.7 | — | 4.7 | — |

(In Table 1, unit: seconds; *: no curing.)

Additives shown in Table 1 are as follows. Example 1, benzothiazole; Inventive Example 2, triphenyl phosphine; Comparative Example 1, tributylamine; Comparative Example 2, phenyl sulfide; Comparative Example 3, N,N-dimethylacetamide; Comparative Example 4, pyridine; and Comparative Example 5, o-nitroanisole.

Inventive Example 3:

A 50 liter capacity stainless steel reaction vessel equipped with an agitator was charged with 10.0 kg (41.6 mol) of 1,3,5,7-tetramethylcyclotetrasiloxane and 12.0 kg of toluene and the mixture was heated at 80° C. in an atmosphere n. With thorough agitation, 189 mg (1.40 mmol) of benzothiazole as a 1 wt % toluene solution was added thereto. Ten minutes thereafter, a bis(1,3-divinyl-1,1,3,3-tetramethyldisiloxane)-platinum complex catalyst ($8.2 \times 10^{-2}$ mmol) was further added. After additional 10 minutes, a mixture of 0.575 kg (4.16 mol) of 1,9-decadiene and 1.15 kg of toluene was added spending 1 hour while loading sufficient agitation. After addition of the entire amount, the agitation was continued at 80° C. until disappearance of remaining 1,9-decadiene which was determined by a gas chromatography. The reaction mixture was concentrated to give 2.15 kg of an Si-H group-containing curing agent as the resulting residue. A GPC analysis revealed that the main component of this product is a compound (a) having a structure of the following formula. Also, determination of the amount of hydrogen gas generated by hydrolysis of this product with an aqueous alkali solution revealed that the Si-H group content of this product is 0.951 mol/100 g. During this reaction, exothermic reaction was hardly observed. Results of the analysis of the rate of this reaction calculated based on the remaining amount of 1,9-decadiene are shown in FIG. 1. In this drawing, C represents concentration of remaining 1,9-decadiene and $C_0$ represents its initial concentration. It can be seen that the reaction rate is stable and almost first-order with respect to 1,9-decadiene. The product showed no significant changes in its properties after a half year of storage at room temperature.

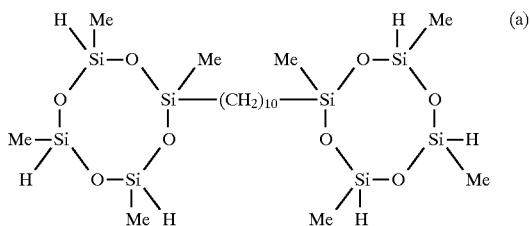

Inventive Example 4:

To the reaction system practiced in the same manner as described in Inventive Example 3 was added, after completion of the reaction, 189 mg (1.40 mmol) of benzothiazole as a 1 wt % toluene solution. Thereafter, the reaction mixture was concentrated in the same manner. The product showed no significant changes in its properties after 2 months of sealed storage at 40° C.

Inventive Example 5:

A 5 liter capacity glass reaction vessel equipped with an agitator was charged with 63.3 g (Si-H 1.00 mol) of H-oil (trimethylsilyl sealed polymethylhydrosiloxane; Si-H 15.8 mmol/g) and 60.0 ml of toluene, and the mixture was heated at 80° C. in an atmosphere of nitrogen. With thorough agitation, 2.99 mg ($2.21 \times 10^{-5}$ mmol) of benzothiazole as a 1 wt % toluene solution was added. Ten minutes thereafter, a bis(1,3-divinyl-1,1,3,3-tetramethyldisiloxane)-platinum complex catalyst ($0.52 \times 10^{-5}$ mmol) was further added. After additional 10 minutes, a mixture of 26.0 g (0.25 mol) of styrene and 20.0 ml of toluene was added spending 30 minutes while loading sufficient agitation. After addition of the entire amount, the heating agitation was continued for 2 hours. The reaction mixture was concentrated to give 83.3 g of an Si-H group-containing curing agent as the resulting residue. The aforementioned analysis revealed that the Si-H group content of this product is 0.78 mol/100 g. This product showed no significant changes in its properties after 1 month of storage at room temperature.

Inventive Example 6:

An Si-H group-containing curing agent was synthesized in the same manner as described in Inventive Example 5 except that styrene was used in an amount of 52.0 g and added neat spending 1 hour. The Si-H group content was found to be 0.40 mol/100 g. This product showed no significant changes in its properties after 1 month of storage at room temperature.

Comparative Example 6:

An Si-H group-containing curing agent was synthesized in the same manner as described in Inventive Example 5 except that benzothiazole was not added. The Si-H group content was found to be 0.50 mol/100 g. This product gelatinized after 1 week of storage at room temperature.

Reference Example 1:

To 200 g of the terminal allyl etherificated polyoxypropylene synthesized in Production Example 1 were added 4.84 g of the organopolysiloxane-based curing agent synthesized in Inventive Example 2 (allyl and Si-H groups are equivalent), 0.20 g (1.38 mmol) of dimethyl maleate and $2.3 \times 10^{-2}$ mmol of $Pt[\{CH_2=CH)Me_2Si\}_2O]_2$ catalyst solution, followed by thorough mixing. The thus prepared composition was poured into a mould of about 2 mm in thickness and subjected to 1 hour of degassing at room temperature in a vacuum dryer. Thereafter, this was heated at 100° C. for 1 hour to give a cured product. A No.3 dumbbell test piece was prepared by punching the thus cured sheet in accordance with JIS K 6301 and subjected to a tensile test at an elastic stress rate of 200 mm/minute. Results of the analysis are shown in Table 2.

TABLE 2

|  | M25 | M30 | M50 | M100 | M150 | TB | EB | Gel Content |
|---|---|---|---|---|---|---|---|---|
| Inv Ex. 6 | 1.55 | 1.88 | 3.3 | 5.12 | 6.63 | 8.64 | 217% | 92% |

In Table 2, M (the succeeding numeral indicates elongation expressed by %) represents modulus (unit: kg/cm$^2$). TB represents breaking strength (kg/cm$^2$) and EB represents elongation at rupture. The term "gel content" means decreasing ratio of weight of the cured product when it was put into a wire netting, soaked for 1 day in toluene and then dried.

Inventive Example 7:

A 50 liter capacity stainless steel reaction vessel equipped with an agitator was charged with 44.25 kg (184.0 mol) of fresh 1,3,5,7-tetramethylcyclotetrasiloxane and heated at 80° C. in an atmosphere of nitrogen. With thorough agitation, thereto was added a solution of 248 mg (1.84 mmol) of benzothiazole dissolved in 2.0 g of toluene. Ten minutes thereafter, xylene solution of a bis(1,3-divinyl-1,1,3,3-tetramethyldisiloxane)-platinum complex catalyst (1.11 g; $1.08 \times 10^{-1}$ mmol) was further added. After additional 10 minutes, a mixture consisting of 2.874 kg (20.8 mol) of 1,9-decadiene and 5.75 kg (23.9 mol) of fresh 1,3,5,7-tetramethylcyclotetrasiloxane was added spending 1 hour while loading sufficient agitation. After addition of the entire amount, the agitation was continued at 80° C. until disappearance of remaining 1,9-decadiene which was determined by a gas chromatography. After completion of the reaction, thereto was added a solution of 248 mg (1.84 mmol) of benzothiazole dissolved in 2.0 g of toluene. The reaction mixture was concentrated by evaporation under a reduced pressure at about 60° C. to obtain 10.8 kg of a colorless and transparent Si-H group-containing curing agent as the resulting residue. This yield means that about 16% of the material 1,3,5,7-tetramethylcyclotetrasiloxane was consumed and about 84% was recovered. A GPC analysis revealed that the main component of this product is the compound (a) described in Inventive Example 3. Also, determination of the amount of hydrogen gas generated by hydrolysis of this product with an aqueous alkali solution revealed that the Si-H group content of this product is 0.976 mol/100 g. During this reaction, exothermic reaction was hardly observed. This product showed no significant changes in its properties after 2 months of storage at 40° C. Analyses of the recovered material by gas chromatography and $^1$H-NMR showed that modification did not occur and highly purified material was recovered.

The same production process was repeated several times. The same product was obtained with no problems and highly purified material was recovered.

Inventive Example 8:

When the synthesis of Inventive Example 7 was repeated using 1,3,5,7-tetramethylcyclotetrasiloxane recovered in Inventive Example 1, the same product of Inventive Example 7 was obtained and highly purified material was recovered.

The same production process was repeated several times. The same product of Inventive Example 7 was obtained with no problems and highly purified material was recovered.

Inventive Examples 9 to 16:

The recovery and recycling of a material 1,3,5,7-tetramethylcyclotetrasiloxane were repeated in the same manner as described in Inventive Example 8 until the material was used 10 times. The 1,3,5,7-tetramethylcyclotetrasiloxane was used as the only material in each synthesis. The same product of Inventive Example 7 was obtained in each recycled use with no problems, and the recovered material showed no modification and its high purity was maintained, though accumulation of a small amount of impurities was observed as the recycle numbers increased. Since recovery of the material was carried out by simple distillation, recovery loss was hardly found and 80% or more of the material was converted into the product after 10 times of the use of the material.

Results of the analysis of products obtained in Inventive Examples 7 to 16 are shown in Table 3.

TABLE 3

| Inventive Examples | Number of Times of Material Used | Yield (kg) | Si—H Value of Material (mol/100 g) |
|---|---|---|---|
| 7 | 1 | 10.7 | 0.976 |
| 8 | 2 | 10.6 | 0.980 |
| 9 | 3 | 10.5 | 0.993 |
| 10 | 4 | 10.8 | 0.986 |
| 11 | 5 | 10.7 | 0.984 |
| 12 | 6 | 10.8 | 0.967 |
| 13 | 7 | 10.8 | 0.982 |
| 14 | 8 | 10.7 | 0.968 |
| 15 | 9 | 10.6 | 0.973 |
| 16 | 10 | 10.8 | 0.975 |

INDUSTRIAL APPLICABILITY

The present invention provides a method for easy control of hydrosilylation reaction and a process for the production of an organic compound modifying silicon compound having 2 or more hydrosilyl groups in the molecule making use of the controlling method. This compound is used as a curing agent of addition type curable compositions. As an accompanying effect, storage stability of the produced curing agent is improved when a catalyst and additives of the present invention remain therein, in comparison with the case in which only the catalyst remains.

We claim:

1. A process for producing an organic curing agent containing hydrosilyl groups using a hydrosilylation reaction, which comprises carrying out hydrosilylation of, an olefin by reacting said olefin with a polyvalent hydrogen organosilicon compound using a metal catalyst in the presence of a compound selected from thiazoles and phosphines to control the hydrosilylation reaction, wherein the hydrosilyl groups are present in excess of the number of olefin carbon-carbon double bonds.

2. The process for producing an organic curing agent containing hydrosilyl groups according to claim 1, wherein said compound selected from thiazoles and phosphines is benzothiazole.

3. The process for producing an organic curing agent containing hydrosilyl groups according to claim 1, wherein said compound selected from thiazoles and phosphines is triphenylphosphine.

4. The process for producing an organic curing agent containing hydrosilyl groups according to claim 1, wherein said olefin is selected from a group consisting of the following formulae (1) to (4):

  (1)

  (2)

  (3)

  (4)

wherein $R^1$ represents a hydrogen atom or a methyl group; $R^2$ represents a hydrocarbon radical having 0 to 18 carbon atoms, which may contain at least one ether linkage; each of $R^3$, $R^4$ and $R^6$ represents a monovalent to tetravalent organic group having 1 to 30 carbon atoms; $R^5$ represents a monovalent to tetravalent hydrocarbon radical having 1 to 50 carbon atoms; and a is an integer selected from 1 to 4.

5. The process for producing an organic curing agent containing hydrosilyl groups according to claim 1 or 4, wherein said polyvalent hydrogen organosilicon compound is a trimethylsilyl terminal polymethylhydrosiloxane.

6. The process for producing an organic curing agent containing hydrosilyl groups according to claim 1 or 4, wherein said polyvalent hydrogen organosilicon compound is a polyvalent hydrogen polyorganosiloxane of 500 or less in molecular weight having 3 or more hydrosilyl groups in 1 molecule.

7. The process for producing an organic curing agent containing hydrosilyl groups according to claim 1 or 6, wherein said olefin is 1,9-decadiene and said polyvalent hydrogen organosilicon compound is 1,3,5,7-tetramethylcyclotetrasiloxane.

8. The process for producing an organic curing agent containing hydrosilyl groups according to claim 1 or 4, wherein a compound selected from thiazoles and phosphines is added after completion of the addition reaction of hydrosilyl groups to olefin using a metal catalyst.

9. The process for producing an organic curing agent according to claim 1, wherein said hydrosilylation reaction is carried out in the absence of solvent.

* * * * *